United States Patent
Ybarra

(10) Patent No.: US 7,158,073 B2
(45) Date of Patent: Jan. 2, 2007

(54) SYSTEMS AND METHODS FOR MANAGING TRANSMISSION POWER INTO A SHARED MEDIUM

(75) Inventor: Kathryn W. Ybarra, Surprise, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 80 days.

(21) Appl. No.: 10/825,592

(22) Filed: Apr. 14, 2004

(65) Prior Publication Data

US 2005/0231418 A1 Oct. 20, 2005

(51) Int. Cl.
*G01S 13/93* (2006.01)

(52) U.S. Cl. .............................. 342/29; 342/30; 342/82

(58) Field of Classification Search ................... 342/29
See application file for complete search history.

(56) References Cited

U.S. PATENT DOCUMENTS

| | | | | |
|---|---|---|---|---|
| 4,107,674 | A | * | 8/1978 | Funatsu et al. ................ 342/32 |
| 5,235,336 | A | * | 8/1993 | Sturm et al. ................... 342/30 |
| 5,280,285 | A | | 1/1994 | Curtis et al. |
| 5,369,591 | A | * | 11/1994 | Broxmeyer .................. 701/301 |
| 6,483,453 | B1 | | 11/2002 | Oey et al. |
| 6,617,997 | B1 | * | 9/2003 | Ybarra et al. .................. 342/29 |
| 6,657,578 | B1 | * | 12/2003 | Stayton et al. ................. 342/30 |
| 6,766,250 | B1 | * | 7/2004 | Ybarra et al. ................ 701/301 |
| 2002/0063653 | A1 | | 5/2002 | Oey et al. |
| 2003/0016159 | A1 | | 1/2003 | Stayton et al. |
| 2003/0122701 | A1 | | 7/2003 | Tran |
| 2004/0174295 | A1 | * | 9/2004 | Stayton et al. .............. 342/182 |

OTHER PUBLICATIONS

"Minimum Operational Performance Standards for Traffic Alert and Collision Avoidance System II (TCAS II) Airborne Equipment," Dec. 16, 1997, RTCA/DO-185A, pp. 32-45, 84-105.

"Traffic Alert/Collision Avoidance System," No Author Listed, Retrieved from the Internet on Aug. 16, 2005: URL: http//www.allstar.fiu.edu/aero/TCAS.htm. pp. 1-6.

\* cited by examiner

*Primary Examiner*—Thomas H. Tarcza
*Assistant Examiner*—Matthew M. Barker
(74) *Attorney, Agent, or Firm*—Allen J. Moss; David E. Rogers; Squire, Sanders & Dempsey L.L.P.

(57) ABSTRACT

A system for transmitting into a shared medium includes a processor, a transmitter, and a receiver. The processor is coupled to the transmitter for transmitting in a manner, at a time, and at a power level as directed by the processor. The processor determines from cooperation with the receiver the number of transmitters expected to be sharing the medium at a future time when transmitting is desired; prescribes a total power for a plurality of transmissions; and prescribes a maximum power for individual transmissions of various types. As implemented for air traffic collision avoidance, a suitable total power for MODE S interrogations transmitted by a TCAS unit on the host aircraft and a suitable power level for individual interrogation transmissions are set according to the detected number of operational TCAS in the airspace, the detected or reported number of members in a flight formation that includes the host aircraft, the altitude of the host aircraft, and the distances from the host aircraft to other members of the flight formation. Other implementations adjust receiver sensitivity, for example, increasing the minimum trigger level (MTL) for detecting interrogations and squitters. With decreased receiver sensitivity, continued use of limited transmission power levels improves system reliability and decreases interference of TCAS with other systems such as ATCRBS. Further implementations revise conventional TCAS interference limiting techniques. Transmission of broadcast messages may be conducted at reduced power or omitted.

35 Claims, 9 Drawing Sheets

SYSTEMS AND METHODS FOR MANAGING TRANSMISSION POWER INTO A SHARED MEDIUM

FIELD OF THE INVENTION

Embodiments of the present invention relate to systems that transmit in an environment where reducing transmitted power may reduce interference experienced by receivers intended to receive the transmitted signals and other receivers.

BACKGROUND OF THE INVENTION

Conventional transmitters for various purposes may share a common medium for transmission. The medium may include a portion of the electromagnetic spectrum in free space or in one or more conductors (e.g., electrical, magnetic, or optical). Generally, reception of transmitted signals may be impeded when transmissions overlap, for example, by occupying the same portion of the electromagnetic spectrum at substantially the same period of time as detected by any receiver coupled to receive from the medium. Overlapping signals may be distinguishable if different in received signal strength or in modulation. However, in a medium where transmitters of the same or different systems are not otherwise controlled to reduce overlap, the reliability of each system using the common medium may be degraded when the likelihood of overlap increases. Overlap becomes more likely, generally, as the number of transmissions in a period of time increases.

Systems designed for high reliability include systems relied upon for reducing the risk of loss of equipment and loss of human life. The problems described above present serious reliability, security, and economic limitations on the use of one or more systems having transmitters that share a common medium. For example, aircraft collision avoidance systems share free space for transmitting interrogations and replies in portions of the radio spectrum designated by government regulations. One such system, commonly known as a traffic collision avoidance system (TCAS) operated in an aircraft in flight includes methods for transmitting at limited frequencies, times, and power levels to reduce interference among other TCAS equipped aircraft, conventional air traffic control systems, and navigation systems. Transmission power levels are conventionally limited according to a so called Interference Limiting technique and according to a Whisper-Shout technique, both of which being well known and specified in DO-185A "Minimum Operational Performance Standards for Traffic Alert and Collision Avoidance System II (TCAS II)" available from RTCA Inc. However, substitute and additional methods for determining suitable transmission power levels are needed to further improve the reliability of TCAS systems so as to reduce the risk of economic losses and the risk of loss of human life. Methods according to the present invention and systems that employ these methods improve the reliability of any systems that share any common medium.

SUMMARY OF THE INVENTION

A method, according to various aspects of the present invention, is used to transmit into a medium into which a plurality of transmitters may transmit. The method is performed by a transmitter of the plurality and includes, in any order: (a) determining a distribution model of a distribution of transmitters of the plurality; (b) determining a formation model of a formation in which the transmitter is positioned; and (c) determining a total transmit power for a subsequent period of time. The total transmit power is determined in accordance with the distribution model and the formation model.

A method, according to various aspects of the present invention, is used to track proximity of vehicles of a plurality of vehicles. Each vehicle includes a transmitter for transmitting location information. The method includes, in any order: (a) receiving the location information; (b) determining a distribution model of a distribution of transmitters of the plurality; (c) determining a formation model of a formation in which the transmitter is positioned; (d) determining a total transmit power for a subsequent period of time, wherein the total transmit power is determined in accordance with the distribution model and the formation model; (e) transmitting interrogations in accordance with the total transmit power; (f) determining a receiver sensitivity for receiving during the subsequent period of time; and (g) determining a track of a vehicle of the plurality in accordance with the received location information.

A system, according to various aspects of the present invention, transmits into a medium into which a plurality of transmitters may transmit. The system includes circuitry that determines a distribution model of a distribution of transmitters of the plurality, determines a formation model of a formation in which the transmitter is positioned; and determines a total transmit power for a subsequent period of time, wherein the total transmit power is determined in accordance with the distribution model and the formation model.

A system, according to various aspects of the present invention, tracks proximity of vehicles of a plurality. Each vehicle includes a transmitter for transmitting location information. The system includes a receiver that receives the location information; circuitry that determines a distribution model of a distribution of transmitters of the plurality, circuitry that determines a formation model of a formation in which the transmitter is positioned, and circuitry that determines a total transmit power for a subsequent period of time, wherein the total transmit power is determined in accordance with the distribution model and the formation model. The system further includes a transmitter that transmits interrogations in accordance with the total transmit power; and circuitry that determines a receiver sensitivity for receiving during the subsequent period of time, and that determines a track of a vehicle of the plurality in accordance with the received location information.

By recognizing and accounting for formation membership according to a formation model, transmit power may be reduced below conventional transmit power levels to avoid interfering with other transmitters and systems that share use of the common communication medium.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
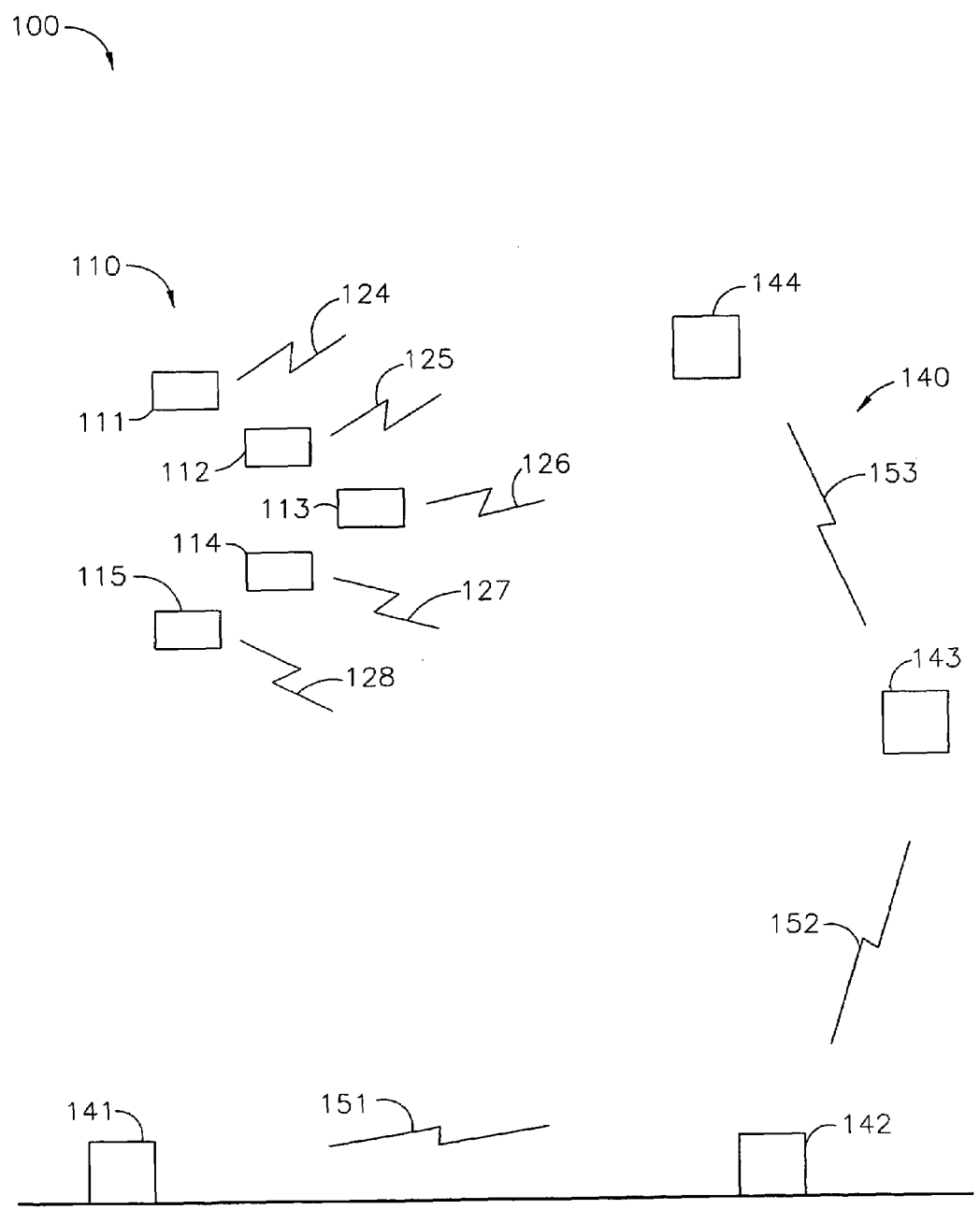
FIG. 1 is a layout of transmitter units using a common medium according to various aspects of the present invention.

Systems and portions of systems that transmit into a shared medium may reduce transmitted power to reduce interference experienced by receivers coupled to the shared medium including receivers intended to receive the transmitted signals and other receivers. By reducing transmitted power into a medium where signals degrade with distance, the size or range of that portion of the shared medium where interference may occur is reduced. For example, in an implementation where the medium is free space and transmitting is accomplished with some portion of the electromagnetic spectrum, signal strength generally decays proportional to the square of distance between a transmitter and a receiver. By reducing transmitted power, a volume of free space may be simultaneously occupied by a larger number of systems and portions of systems that transmit. For instance, as the airspace becomes more congested in the vicinity of an air port, reducing transmitted power from aircraft and ground based transmitters permits more aircraft each having a transponder or interrogator to detect signals from each other and thereby reliably avoid collision.

In contrast with prior art systems and methods, systems and methods of the present invention include one or more of the following capabilities: reducing total transmit power as opposed to transmit power for transmissions to a particular target or targets; reducing peak power per interrogation; decreasing receiver sensitivity to avoid determining to transmit an interrogation; determining transmit power according to a method of the type known as interference limiting (that uses a distribution model) modified according to this disclosure to account for location of transmitters in a formation; including formation members more than once in the counts of a distribution model; applying a percentage reduction of transmit power in addition to the transmit power determined by using a method of the type known as interference limiting; reducing a power cap on individual transmissions below that prescribed by conventional interference limiting; reducing a power cap for broadcast transmissions with reference to a reduced power cap for non-broadcast transmissions; transmitting according to a priority that is based on a type of message to be transmitted; transmitting interrogations in a sequence that effectively utilizes a transmit power budget within a reduced range of reception of replies; and automatically entering or exiting a mode of transmitter operation based on a change of membership status in a formation of transmitters, or change of location of the transmitter (e.g., altitude, or range to other members).

Systems and methods of the present invention may be implemented in any environment having multiple transmitters for one or more purposes. For example, such an environment may include one or more independent systems for coordinating the movement of vehicles traveling in the environment. Vehicles each having a transmitter and possibly a receiver may travel on land, on or in water, and/or in atmospheric or space flight. Transmitting may provide information for effective coordination of movement (e.g., vehicular collision avoidance, or movement in formation) and/or information about hazards (e.g., terrain, objects, weather, currents, turbulence, road hazards, traffic, or a limited capability to coordinate movement). These functions may be accomplished with one system having integrated capabilities or with several rather independent systems. Nevertheless, reducing transmission power for one purpose (e.g., maintaining flight formation) may benefit system reliability for another purpose (e.g., air traffic collision avoidance).

In the example environment of FIG. 1, two systems each having multiple subsystems are sharing a common medium 100. Each subsystem, also called a transmitter unit, is capable of transmitting into the medium 100 at various times. According to various aspects of the present invention, receivers are capable of improved signal detection as a consequence of the reduction in overlapping transmissions. Overlapping transmissions may overlap in space, time, spectrum, and/or modulation technique.

For example, the first system 110 includes subsystems 111, 112, 113, 114, and 115, each having transmitting and receiving capabilities. Subsystems 111–115 respectively transmit signals 124–128 for reception by others of subsystems 111–115. The second system 140 includes subsystems 141, 142, 143, and 144. Subsystems 141–144 respectively transmit signals 151–153. Signals 124–128 and 151–153 may overlap in space (e.g., when subsystems' transmitting and receiving operational antenna patterns occupy the same space), in time, in frequency, and/or modulation. By reducing transmit power level, the operational antenna pattern for transmitting may be reduced in spatial extent. By reducing receiver sensitivity, the operational antenna pattern for receiving may be reduced in spatial extent. The combined effect of reducing antenna patterns may reduce interference among the subsystems 111–115 and 141–144 and among systems 110 and 140.

In one implementation shared communication medium 100 is free space. Subsystems may be in flight (111–115 and 143–144) or ground based (e.g., 141, 142). In other implementations, the medium is a common conductor (e.g., a wave guide, cable, or fiber). Still other implementations share a common medium underwater or under ground.

As shown in FIG. 1, transmitter units may be included in vehicles of any type. For example, subsystems 111–115 may correspond to aircraft flying in a formation. Typically, a formation of transmitter units includes a spatial arrangement of transmitter units that is maintained while the transmitter units are in motion. Movement of transmitter units may be facilitated by any conventional mode of transportation (e.g., pedestrians each wearing a transmitter unit; or land, water, air, or space vehicles equipped with a transmitter unit). In an alternate definition of a formation, several transmitter units each have access to a list of identifications of transmitter units assigned to be included in the formation. Consequently, the formation and its members are defined by the list. At any particular time, listed transmitter units may or may not be located in spatial arrangement. These two definitions may apply when, for example, the listed transmitter units enter and maintain a spatial arrangement (e.g., for a portion of a military mission).

Signals 124–128 and 151–153 may include location information and/or identification information. These signals may be transmitted spontaneously or transmitted in response to interrogation received by a receiver coupled to the transmitter of the transmitter unit.

Figure 2:
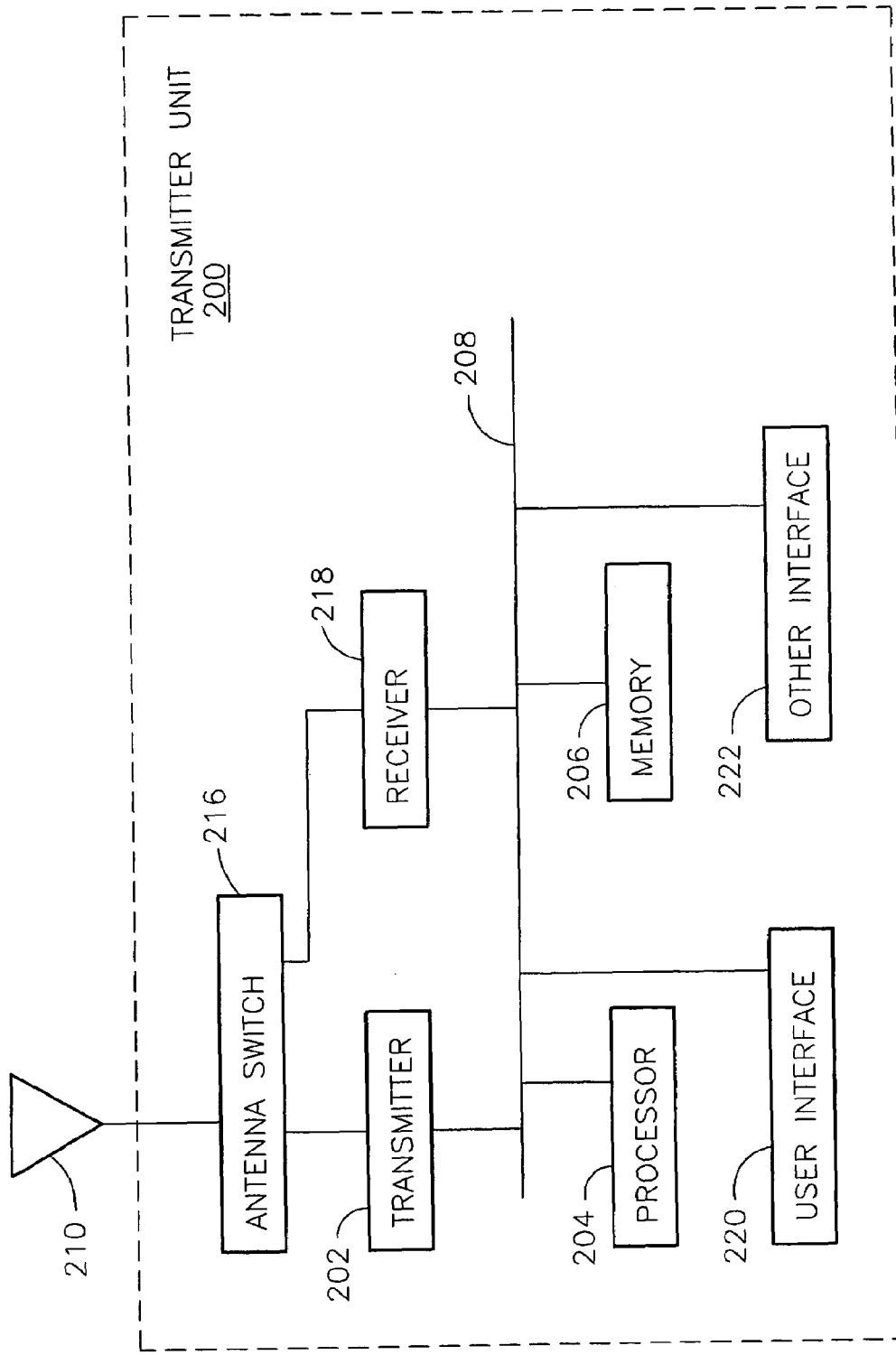
FIG. 2 is a functional block diagram of a transmitter unit of FIG. 1.
Figure 3:
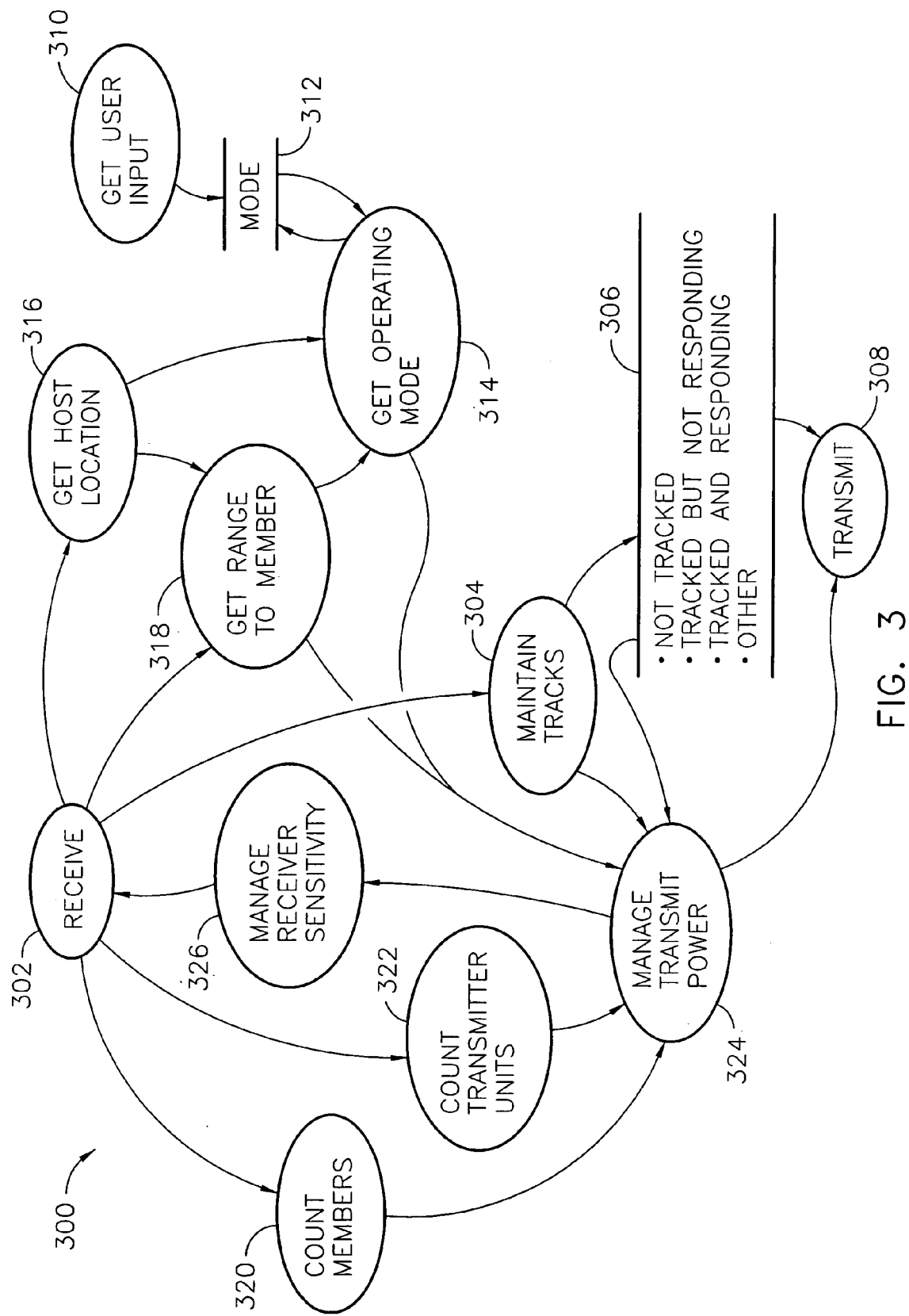
FIG. 3 is a data flow diagram of a method for transmitting performed in a transmitter unit of FIG. 1.

For example, transmitter unit 200 of FIG. 2 may be used in place of any one or more subsystems of FIG. 1 discussed above. Transmitter unit 200 includes transmitter 202, processor 204, memory 206, receiver 218, user interface 220, and other interfaces 222 all coupled together by bus 208 for data communication and cooperation. Transmitter 202 and receiver 218 are coupled to antenna switch 216 so that each can share use of antenna 210. Conventional materials and assembly techniques may be used to implement transmitter unit 200, such as use of conventional microwave transmitter, receiver, and antenna switching circuitry and use of conventional digital computing circuitry for all functional blocks of FIG. 2 and bus 208. Generally, processor 204 cooperates with memory 208 to execute instructions stored in memory 208 to perform methods of the present invention (e.g., FIGS. 3 and 4A–4D).

Processor 204 directs transmitter 202 to transmit at particular intervals of time. Direction for transmitting may include specification of any or all of data to transmit, signaling protocol, signal modulation or frequency, and transmit power. Transmit power may be specified as a budget for a period of time during which several transmissions are made, or specified as a magnitude to be used for one or more particular transmissions. Processor 204 also directs receiver 218 to use a particular receiver sensitivity for receiving signals at particular intervals of time.

Interfaces facilitate cooperation among subsystems. User interface 220 may include any conventional control panel or graphical user interface for receiving input from a human operator and/or for providing status messages to a human operator. Other interfaces 222 may include any conventional communication mechanism for transmitter unit 200 to cooperate with other conventional subsystems (e.g., navigation subsystems or vehicle control subsystems).

In alternate implementations, transmitter 202, receiver 218, antenna switch 216, and antenna 210 are replaced with conventional circuitry for communication in other media, such as telephone networks, cable television networks, data communication networks, data processing facilities, and data storage networks.

As discussed above, processor 204 may perform processes to implement transmitter power control and/or receiver sensitivity control according to various aspects of the present invention. For example, processor 204 may perform process 300 of FIG. 3 to govern among other things transmitting by transmitter 202 and receiving by receiver 218. Process 300 includes receive process 302, maintain tracks process 304, track store 306, transmit process 308, get user input process 310, mode store 312, get operating mode process 314, get host location process 316, get range to member process 318, count members process 320, count transmitter units process 322, manage transmit power process 324, and manage receiver sensitivity process 326. Process 300 is described below for an implementation of a collision avoidance system (e.g., a TCAS per DO-185A). In an alternate implementations according to various aspects of the present invention, process 300 may omit tracking functions (e.g., omit processes 304, 306, and simplify other processes accordingly) and operate merely as a transponder.

A receive process obtains signals from the shared medium and detects location and/or identification information from received signals. Location information describes the location of the sender of the signal being received. Identification information also describes the sender. For example, receive process 302 operates antenna switch 216 and receiver 218 to store location and identity information in memory 206. Location and/or identity may be concluded from protocol or messages received from other transmitter units. Messages may include location information or location information may be determined by conventional methods such as using directional antennas and/or determining one or more distances from time of arrival of received signals.

A track is a model of the position, direction, and/or movement of a transmitter unit. The track may be historical and/or predictive. A process that maintains a track, analyzes information provided by a receive process to identify when location and identification information are sufficient to define a track for what seems to be a vehicle having a transmitter unit. Maintain tracks process 304 posts new and revised results into track store 306. Maintain tracks process 304 may implement various timing conditions to automatically change the status of a track on the occurrence or nonoccurrence of received signals during periods of time measured by process 304. Maintain tracks process 304 may also request transmission (e.g., of an interrogation) by suitably informing and alerting manage transmit power process 324.

A record of track store 306 may include an identification of a transmitter unit (e.g., aircraft tail number, network address, device number, handle, or username) and status of the track if any. For example, track status may include: not tracked (e.g., no track is yet defined or existing track is no longer valid), tracked but not responding (e.g., interrogations have been sent by the host transmitter unit but no valid responses have been received as from the tracked transmitter during an allowed period of time), tracked and responding (e.g., a normal condition for cooperating transmitter units in range of each other), or other (e.g., a received signal having an unexpected transmitter identification may be listed as other so that it is not processed in the same way as those that are "not tracked").

A transmit process assures that transmissions are suitable to meet transmitting requirements. Typically a transmit process schedules transmissions by identifying the message to be sent and/or controlling how to send it. A transmit process may prepare the message to be transmitted or identify a sequence of signals to be transmitted. Further, a transmit process operates a transmitter to accomplish transmitting. For example, transmit process 308 operates antenna switch 216 and transmitter 202 to accomplish transmitting at times sufficient to satisfy communication requirements within a limited transmit power budget. Communication requirements may specify transmitting at a high power level to each identified transmitter unit that is listed as "not tracked" then transmitting at a lower power level to each identified transmitter unit that is not responding, and so on. Communication requirements may be defined in terms of operating modes for transmitter unit 200. Scheduling may be specified in part by manage transmit power process 324. For example, process 324 may specify what targets and messages are to be transmitted during a surveillance interval; and, process 308 may accomplish each transmission according to a power cap specified by process 324.

Get user input process 310 reads user interface 220 and possibly other interfaces to determine an operating mode for transmitting. After a mode has been established and stored in mode store 312, get operating mode process 314 may from time to time access mode store 312 to provide mode information to manage transmit power process 324. Modes of operation may include: maintain tracks without interrogating (e.g., passive tracking), maintain tracks by interrogating (e.g., active tracking), transmit replies to all or particular types of interrogations, repeatedly transmit location and identification information (e.g., squitters), and combinations of these functions. According to various aspects of the present invention, operating modes determined by process 314 affect the determination of transmit power. Operating modes may be based on any combination of user input, host location, and/or ranges to members. For example, transmitting by process 308 may be limited in power and/or in period between transmissions in accordance with a front panel switch set by an operator designating an operating mode such as "MEMBER MODE" suitable for operation while the host is a member of a formation. Transmitting by process 308 may be similarly limited in accordance with a front panel switch set by an operator designating an operating mode such as "LOW POWER MODE" suitable for applying such limits regardless of whether the transmitter unit is listed as a member or is currently in spatial arrangement in a formation. Operation in a mode having limits on transmitting may be begun or terminated according to host location (e.g., altitude being on-ground or within a predefined range) and/or ranges to members as described by processes 316 and 318.

Get host location process 316 determines the location of the host transmitter unit from instruments accessible to process 316 (e.g., an altimeter or a GPS subsystem) and/or from messages provided by receive process 302. Messages from receive process 302 may include messages from a Global Positioning System (GPS), a ground based system (e.g., markers or transponders), or from another transmitter unit that is currently in a formation that includes the host transmitter unit. The other transmitter unit may determine its own location in any conventional manner and report its own location and/or information sufficient for process 316 to determine the location of the host transmitter unit (e.g., messages may include location of the other transmitter unit and a directed distance between the transmitter units). Process 316 provides the host location to get range to member process 318 and to get operating mode process A get range to member process determines the distance separating two transmitter units (e.g., straight line distance). In particular, get range to member process provides range information between the host transmitter unit and each transmitter unit that is a member of a formation. Membership may be established by being listed whether or not a spatial arrangement of the transmitter units existed or exists currently. Membership may alternatively be established by an existing spatial arrangement or a distance less than a minimum non-member distance. For example, get range to member process 318 receives information regarding members from receive process 302 and receives information regarding host location from process 316. Information regarding members may be derived from messages spontaneously transmitted by other transmitter units (e.g., squitters) or replies to interrogations transmitted by process 308. Get range to member process 318 provides range information to get operation mode process 314 and to manage transmit power process 324. In an alternate implementation, get range to member process determines range with reference to tracks maintained by process 304.

Count members process 320 determines the current quantity of members of the same formation of which the host is a member. Count members process 320 analyzes received messages to determine the current quantity. Process 320 may receive, determine, and/or maintain a list of members. In an implementation wherein the list of members is provided to process 320 (e.g., loaded into a store (not shown) possibly with other information describing a mission), the maximum number of counted members may be the number of members on the list. When no messages from a particular listed member have been received for a predetermined period of time (e.g., 20 minutes), the particular listed member may be deemed absent and no longer included in the count provided by process 320. Process 320 provides the current count of members to manage transmit power process 324. Count members process 320 may cooperate with get range to member process 318 to provide counts of members within predetermined ranges (e.g., members within 3 nmi or members within 6 nmi).

Count transmitter units process 322 determines the current total quantity of transmitter units for which messages are being received by process 302. Transmitter units that are part of a formation (e.g., counted by process 320) are included in the count provided by process 322. Process 322 provides the current count of transmitter units to manage transmit power process 324. Count members process 322 may cooperate with get range to member process 318 to provide counts of members within predetermined ranges (e.g., members within 3 nmi or members within 6 nmi)

A process that manages transmit power, according to various aspects of the present invention, includes any process that determines a budget for a period of time and governs transmitting during the period. Transmitting may be performed until the budget is spent (or exceeded); after which, no further transmitting is permitted until lapse of the period. A budget for each subsequent period is set and transmitting according to the set budget is governed during that period. Energy radiated by transmitting is the integral of transmitted power over duration of transmitting. The budget and accounting may be in terms of energy, power (e.g., when time is predetermined or constant), and/or time (e.g., when power is predetermined or constant). For example, manage transmit power process 324 determines a transmit power budget; directs transmit process 308 to transmit at a specified time, duration, and power; accumulates expenditures of transmit power according to the specified transmissions; and provides information to manage receiver sensitivity process 326. Process 324 may further receive information from maintain tracks process 304 and/or track store 306 (e.g., number of targets being tracked) to be used for determining a power budget and/or for governing transmitting.

The transmit power budget is a suitable forecast (e.g., an allowance within limits permitted by law) for transmitting during a future period of time based on one or more of the operating mode from process 314, the range to members from process 318, the count of members from process 320, and the count of transmitter units from process 322.

Information provided from process 324 to process 308 in various implementations may include any general (e.g., high level) or specific (e.g., step by step low level) commands or information sufficient for transmit process 308 to accomplish appropriate transmission at an expenditure of power consistent with assumptions made by manage transmit power process 324. Process 324 may additionally specify to transmit process 308 what message (e.g., an interrogation) and what target(s) (e.g., all call, class of targets, or individual target(s)) to transmit to during the current transmitting cycle or a subsequent transmitting cycle. In other words, in a preferred implementation, actual energy emitted during transmitting is not measured but is indirectly assessed by assuming proper operation of antennas, coupling circuits, transmitter circuits, and control effected by transmit process 308 on transmissions. In an alternate implementation, receive process 302 samples transmitted energy and provides a description of sampled transmitted energy to manage transmit power process 324 for more accurate, closed loop accounting of the transmit power budget.

Receiver sensitivity may be adjusted for reliable reception based on assumptions about expected signal strength of replies to interrogations. For example, if a relatively high transmit power was used for an interrogation and the reply is expected at a particular time following the interrogation, the receiver sensitivity may be relatively high also during the time a reply is expected based on the assumption that higher transmit power was necessary to traverse a relatively greater distance and the subsequent reply will be relatively weak traversing the same distance. For example, manage receive sensitivity process 326 receives information from process 324 from which process 326 determines an expected reply signal magnitude and period of time of the expected reply. Manage receive sensitivity then directs receive process 302 to use a suitable sensitivity during the period of time of the expected reply signal. By using a low receive sensitivity, noise is eliminated from received signals thereby improving signal to noise ratio and accuracy of reception (e.g., signal detection, demodulation, and message decoding). According to various aspects of the present invention, reducing transmitted power is accompanied by reducing receiver sensitivity for the combined effect of reducing the number of targets considered to be within range for interrogation.

The processes of method 300 may be performed in any convenient manner. For example, each process may be performed when data sufficient for processing is available or accessible by that process. Outputs of each process are generally made available or accessible to other processes as soon as practical.

In a preferred implementation, a transmitter unit performs transmitting and receiving operations to meet a prioritized schedule wherein transmission of multiple types of messages is organized to meet timing requirements according to the respective type of message. In one implementation, all messages of a higher priority type are transmitted prior to transmitting any messages of a lower priority type. In an alternate implementation, messages of a first set of types may be processed with the same priority before messages of a second set of types. By associating a priority to transmission of messages (e.g., by message type, target identity, or indications of range target) limited transmit power may be applied to accomplish the higher priority transmissions including a margin for multiple interrogation transmission attempts to obtain a reply.

Figure 4A:
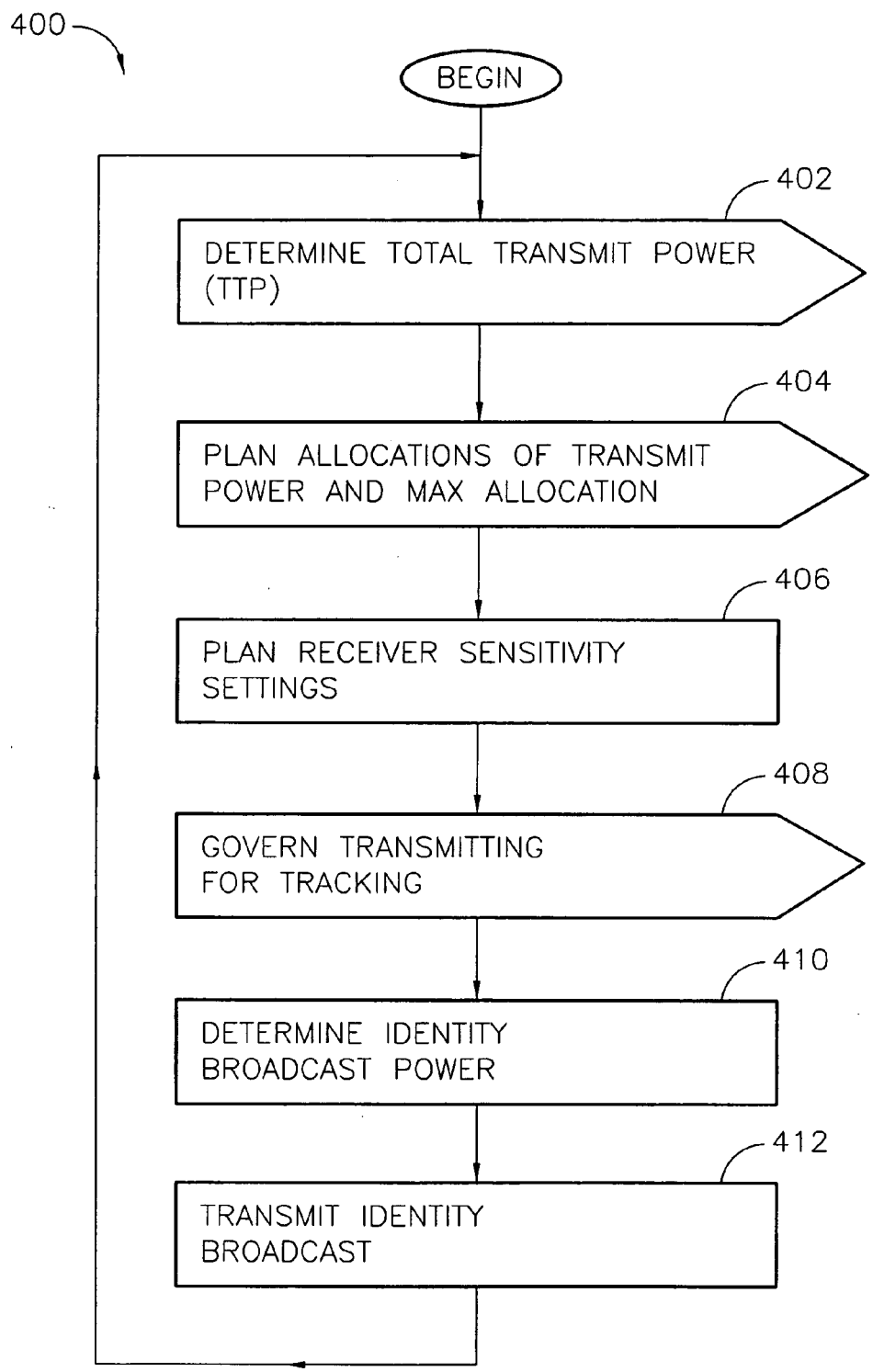
FIGS. 4A through 4D present a process flow diagram of portions of the method of FIG. 3, performed by the processor of FIG. 2.

Managing transmit power includes managing transmit power during a predetermined future period of time (e.g., a so-called transmission cycle or surveillance cycle). For example, method 400 of FIG. 4A, is performed by transmitter unit 200 (e.g., by any combination of 202, 204, and/or 218) and includes a loop (402–412) that is performed for each transmission cycle. In one implementation method 400 is part of manage transmit power process 324.

For each execution of the loop, a total transmit power (i.e., a transmit power budget) is determined (402). Generally, the determination is subject to whether or not the transmitter unit is in a formation as discussed above. Total transmit power (TTP) is generally determined by aspects of a model of the formation (i.e., a formation model) and aspects of a model of transmitter distribution (i.e., a distribution model). Total transmit power is described here for the purpose of transmitting interrogations without regard to the power used for other purposes (e.g., transmitting replies to interrogations, broadcasting identity, or transmitting to coordinate collision avoidance). Other implementations that transmit for one or more other purposes may account for such transmissions in the TTP as described herein or may determine separate budgets for one or more of these purposes.

A plan for how to use the total transmit power is then developed or updated (404). In one implementation, each planned transmission is allocated a portion of the TTP. Criteria controlling the planning process may include limits on the quantity of allocations, the magnitude of individual allocations, and/or the distribution of magnitudes (e.g., variance) of allocations. Allocations may be made according to priority of message type and/or target. In one implementation each allocation must be no greater in magnitude than a predetermined maximum allocation magnitude. The plan may include scheduling a sequence in time beginning with higher priority transmissions and proceeding to lower priority transmissions later in time.

Figure 5:
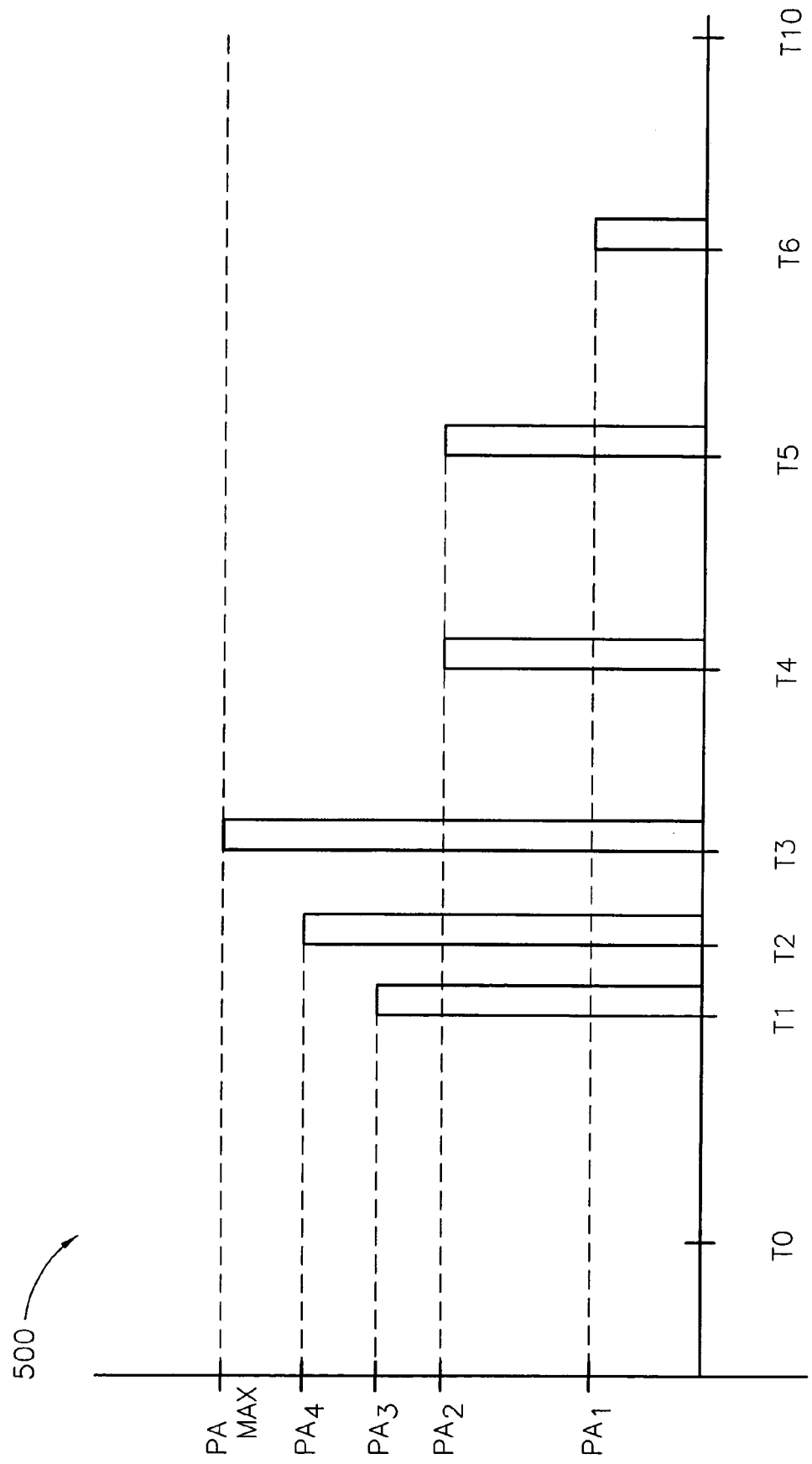
FIG. 5 is a timing diagram of transmissions by the transmitter of FIG. 2.

Typically, several transmissions of interrogations are suitably made in each transmission cycle. For example, transmission cycle 500 of FIG. 5 extends from time T0 to time T10. During cycle 500, interrogations are transmitted at times T1–T6 and at transmit power amplitudes $PA_1$–$PA_4$ and $PA_{MAX}$. After each transmitted interrogation and before a subsequently transmitted interrogation, a reply is expected. As shown for discussion, in the case of interrogations at times T1 and T2, no reply is received; so, increasing transmit power is used for interrogations at times T2 and T3 (e.g., transmit power $PA_{MAX}$ at T3 exceeds $PA_4$ at T2 exceeds $PA_3$ at T1). Interrogations transmitted at times T3–T6 are followed by replies (not shown). Interrogations at times T4 and T5 correspond to interrogations at a predetermined minimum transmit power ($PA_2$) according to a floor as specified in some systems of the prior art. Transmission of an interrogation at time T6 and transmit power $PA_1$, illustrates operation according to various aspects of the present invention where no floor is specified.

Transmission cycle 500 illustrates an actual transmission cycle that corresponds roughly to a planned transmission cycle. For sake of discussion, presume that interrogations at times T1, T4, T5, and T6 constitute a complete plan. Because the number or amplitude of attempted interrogations at times T2–T3 may not have been suitably predictable, transmit power expended for interrogations at times T2 and T3 may leave inadequate power budget for the interrogation to be transmitted at time T6. To avoid exceeding the budget, the interrogation at time T6 may be omitted or reduced in power from a planned amplitude (not shown). The planned amplitude in one implementation may have been $PA_{MAX}$ and in another implementation may have been $PA_2$.

When all planned transmissions are made and transmit power budget remains, a budget surplus is deemed to have resulted at the end of the transmission cycle. Otherwise, a budget deficit is deemed to have resulted, unless, for example, all expected replies were actually received in spite of omitted or reduced power transmissions.

The maximum allocation may be determined in any conventional manner. In one implementation, maximum allocation is increased after a budget surplus in an immediately prior transmission cycle; and, decreased after a budget deficit in the immediately prior transmission cycle. Further, the extent of change from one cycle to the next may be limited to a specified maximum change allowance.

Receiver sensitivity may be set in proportion to the preceding transmit power for each interrogation. For example, an increasing receiver sensitivity may be used for amplitudes $PA_1$–$PA_4$ and $PA_{MAX}$ for interrogations of cycle 500. The plan discussed above with reference to function 404 may be expanded or updated to include planned receiver sensitivity settings (406).

Transmitting may be for the purpose of tracking transmitter units relative to the host transmitter unit. Transmitting for tracking purposes is governed (408) to assure among other goals that the total transmit power for the cycle is not exceeded.

The power to be used for transmitting an identity broadcast may be determined (410) as a predetermined allocation or according to the formation model. For example, identity broadcast for all members of a formation may be omitted when one member of the formation (e.g., a formation leader) broadcasts suitable information describing the formation and/or its members. The apportionment of transmit power between TTP (for tracking) and identity broadcasts may be set in accordance with the formation model. For example, additional TTP may be allowed for a particular formation member not responsible for identity broadcasts.

Identity broadcasts are transmitted (412) in accordance with the determined identity broadcast power discussed above. Control then passes to the top of the loop to repeat method 400 from function 402.

In an implementation of environment 100 having airborne transmitter units for surveillance and/or collision avoidance, a transmission cycle may include messages consistent with conventional air traffic control radar beacon system (AT-CRBS) messages (e.g., interrogations and replies) and messages consistent with conventional mode select (MODE S) messages (e.g., squitters, interrogations, and replies).

Figure 4B:
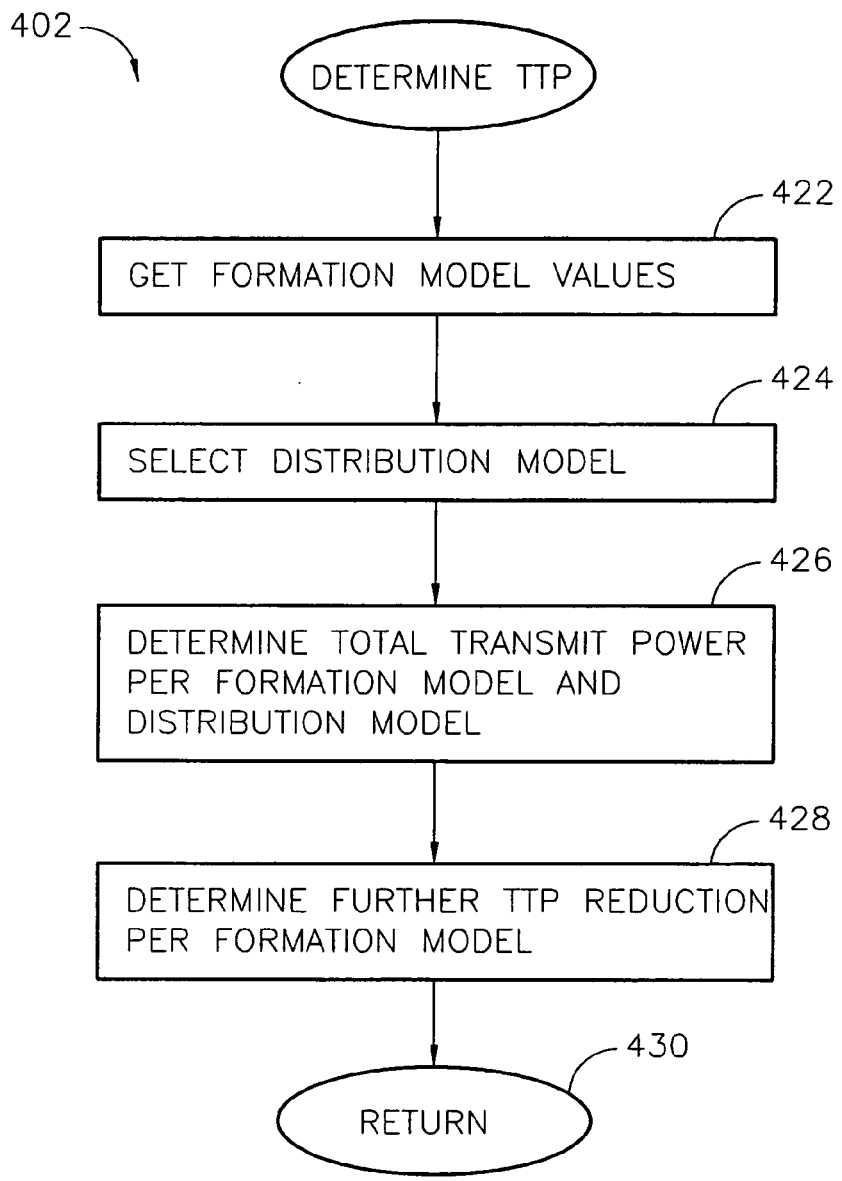

A method 402 for determining a value for total transmit power (TTP) may include the functions shown in FIG. 4B. Method 402 of FIG. 4B includes the case where the transmitter unit that performs the method is part of a host that is a member of a formation and the case where the host transmitter unit is not. In the latter case, functions 422 and 428 are omitted with consequential simplification of function 426. According to various aspects of the present invention TTP is determined according to a distribution model. When in a formation, TTP is further determined according to a formation model.

A model of the distribution of transmitter units (also called a distribution model), in one implementation, includes values that describe the quantity, identity, and location, (e.g., relative range, bearing, and/or azimuth from the host) of targets. Such values may be stored together as a record, file, list, array, or data structure (e.g., in memory or on disk) or may be stored as independent values without regard to access to the model as a whole (e.g., discrete named variables stored dynamically by objects or modules implementing method 300). The distribution model may use respective results of counting transmitter units within predetermined ranges relative to the host.

A model of a formation of transmitter units (also called a formation model), in one implementation, includes values that describe whether or not the host is a member of a formation, and quantities of other formation members within prescribed ranges from the host. The determination of whether the host or a target is a member of a formation may be based on distance between the host and the target. The formation model may further include values that further describe the membership, member locations (formation position and current location), and member roles in a formation (e.g., hierarchical leadership, follower, tail, or tanker). Such values may be stored together as a record, file, list, array, or data structure (e.g., in memory or on disk) or may be stored as independent values without regard to access to the model as a whole (e.g., discrete named variables stored dynamically by objects or modules implementing method Method 402 of FIG. 4B determines membership as a consequence of updating formation model values. Formation model values are updated (422) from counts of members of the same formation that the host transmitter unit is in (e.g., as provided by process 320). If zero, TTP is computed in a manner similar to the case of the host not in a formation. The formation model may also use or include respective counts of transmitter units that are within predetermined communication ranges of the host transmitter unit (e.g., as provided by process 322). The formation model may further include host altitude, if relevant to the environment (e.g., as provided by process 316). A distribution model may include respective counts of transmitter units of formation members within predetermined ranges, counts of transmitter units not associated with formation members, and/or counts (e.g., totals) of transmitter units within predetermined ranges regardless of whether associated with a formation member. On repeated performances of method 402 of FIG. 4B, the model of distribution of transmitter units is updated during each performance in accordance with current counts and current altitude. TTP is then computed (420) based on the up to date distribution model.

After any suitable preparation of the formation model and distribution model, a distribution model appropriate to the transmitter unit performing method 400 and 402 is selected (424). A distribution model is selected as a consequence of whether the transmitter unit performing method 402 is a member of a formation and/or various characteristics of such a formation. A conventional distribution model may be used when the host is not a member of a formation. According to various aspects of the present invention, when the host is a member of a formation, the selected distribution model may include or be revised to include one or more aspects of the formation model.

According to various aspects of the present invention, total transmit power is determined (426) in accordance with the selected distribution model and the formation model. In one implementation, values from the formation model are incorporated into the distribution model for determining TTP.

The total transmit power may be further reduced (428) according to various aspects of the formation model. For example, an initial value for TTP may be calculated based on the selected distribution model and operating criteria (e.g., per DO 185A). The initial value for TTP may be further reduced according to one or more values of the formation model. A reduction factor or term may be obtained from a look-up table accessed in accordance with any formation model value (e.g., number of formation members within 3 nmi, maximum range to a formation member, or total number of formation members). An adjusted value of TTP may be calculated by reducing the initial value of TTP by the factor (e.g., reducing by a percentage) or by the term (e.g., subtracting a predetermined amount). In one implementation the factor for adjusting TTP is about 60% when the host is a formation member and below about 18,000 feet barometric altitude, about 75% when the host is a formation member and above about 18,000 feet barometric altitude, and 100% (i.e., not reduced at all) when the host is not a formation member. The adjusted value of TTP is returned (430) to the calling process as the determined TTP.

Figure 4C:
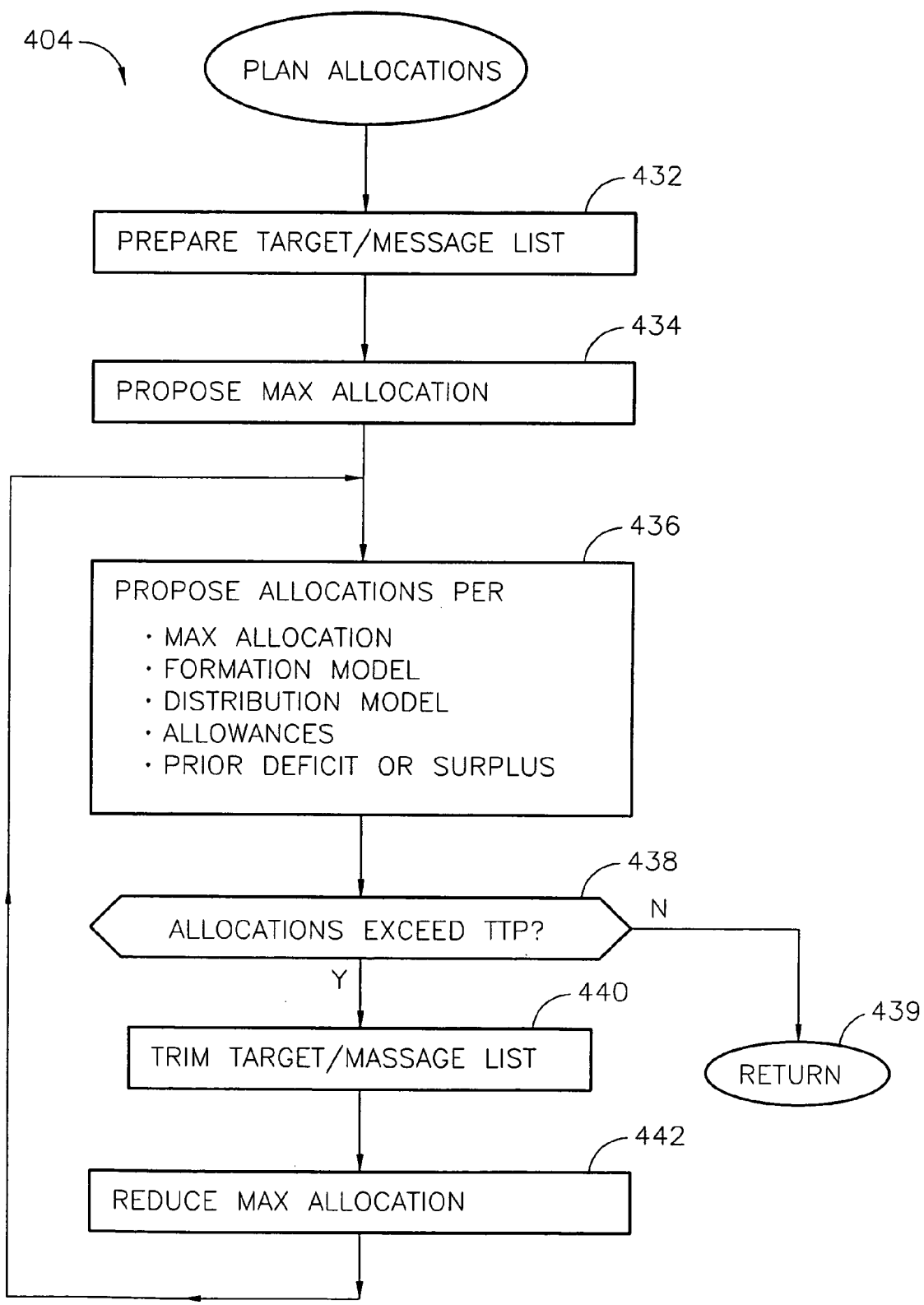

A method 404 for planning allocations of transmit power may include the functions shown in FIG. 4C. Allocations are planned for one or more transmission cycles, preferably one cycle immediately following a currently proceeding transmission cycle. A list of targets and/or messages to be transmitted is prepared (432). The list is generally restricted to messages (or message types) that are consistent with the formation model and distribution model selected as discussed above. For example, in an airborne system, ATCRBS and Mode S interrogation messages may be included because the total transmit power must be allocated among both types of messages. Targets may be included according to the classifications discussed above with reference to track store 306 and a suitable priority for each target/message combination may be assigned. The list may be sorted by priority; or, by message type followed by priority (e.g., to ensure Mode S transmissions are compromised if at all before any ATCRBS transmissions are compromised).

A maximum transmit power allocation to apply to each transmission may be proposed (434). In implementations having further controls on planning allocations, values for each other control may also be proposed. In one implementation, the maximum transmitter capability is initially proposed as the maximum transmit power allocation and repetitions of the loop 436–442 have the effect of subsequently reducing the maximum allocation.

For each transmission listed in function 432 that is of suitable priority, a proposed allocation of transmit power is made (436). The proposed allocation is made in accordance with the maximum allocation (434), the formation model, the distribution model, other allowances (discussed above), and/or any deficit or surplus resulting from prior cycles. Budget surplus or deficit may be effective on several subsequent cycles to achieve a filtered effect. Allowances may include criteria such as a freeze on changes to a particular allocation or value of maximum allocation for a period of time (e.g., 8 seconds per DO-185A), a power differential between power budgets for different classes of messages (e.g., no more than a 3 dB difference between all ATCRBS and Mode S transmissions per DO-185A), a floor (e.g., $PA_2$ of FIG. 5) on transmission amplitude, or limits on the step size and elimination of particular steps in sequences of transmissions (e.g., T1–T3 of FIG. 5) (e.g., whisper-shout sequence requirements of DO-185A).

According to various aspects of the present invention, proposed allocations are in further accordance with the following allowances when the host is a member of a formation: (a) no floor applies; (b) the higher power allocations of a sequence of transmissions (e.g., T3 of FIG. 5) are eliminated; and (c) from 1 to 6 dB of further reduction in power allocation for each of any number of planned transmissions, the extent of further power reduction being in accordance with at least one of host altitude, and the quantity of members of the formation. A table look up implementation may be used to express a nonlinear relationship between an allowance and values of the formation model.

A set of proposed allocations is compared to TTP to determine whether the sum of allocations exceeds the value of TTP. If not, control returns (439) to the calling process. Otherwise, the list (432) may be trimmed by eliminating one or more targets and/or messages. For an airborne system, targets may be excluded according to the classifications discussed above with reference to track store 306 and/or a suitable priority that may have been assigned (432) for each target/message among both ATCRBS and Mode S messages. In addition (or as an alternative), the proposed maximum transmit power allocation (434) may be decreased by a factor or term. Control then returns to proposing allocations (436). The loop repeats until suitable planned allocations do not exceed TTP (438).

Manage transmit power process 324 and transmit process 308 may cooperate to determine (or set) a budget for total transmit power, determine (or set) a maximum allocation (e.g., a power cap) for individual transmissions, govern transmitting, and account for transmitted power to keep within the power cap and within the total transmit power budget. For example, these functions are accomplished by methods 402, 404, and 408. Transmitting in accordance with planned allocations to not exceed a computed TTP may proceed with independent transmitting processes for transmissions related to tracking, transmissions related to ATCRBS, and transmissions related to Mode S until the budget is spent or no further time remains in the transmission cycle.

Transmitting related to ATCRBS and Mode S may proceed in any conventional manner, limited as discussed above to not exceed the computed TTP and maximum allocation per transmission.

Figure 4D:
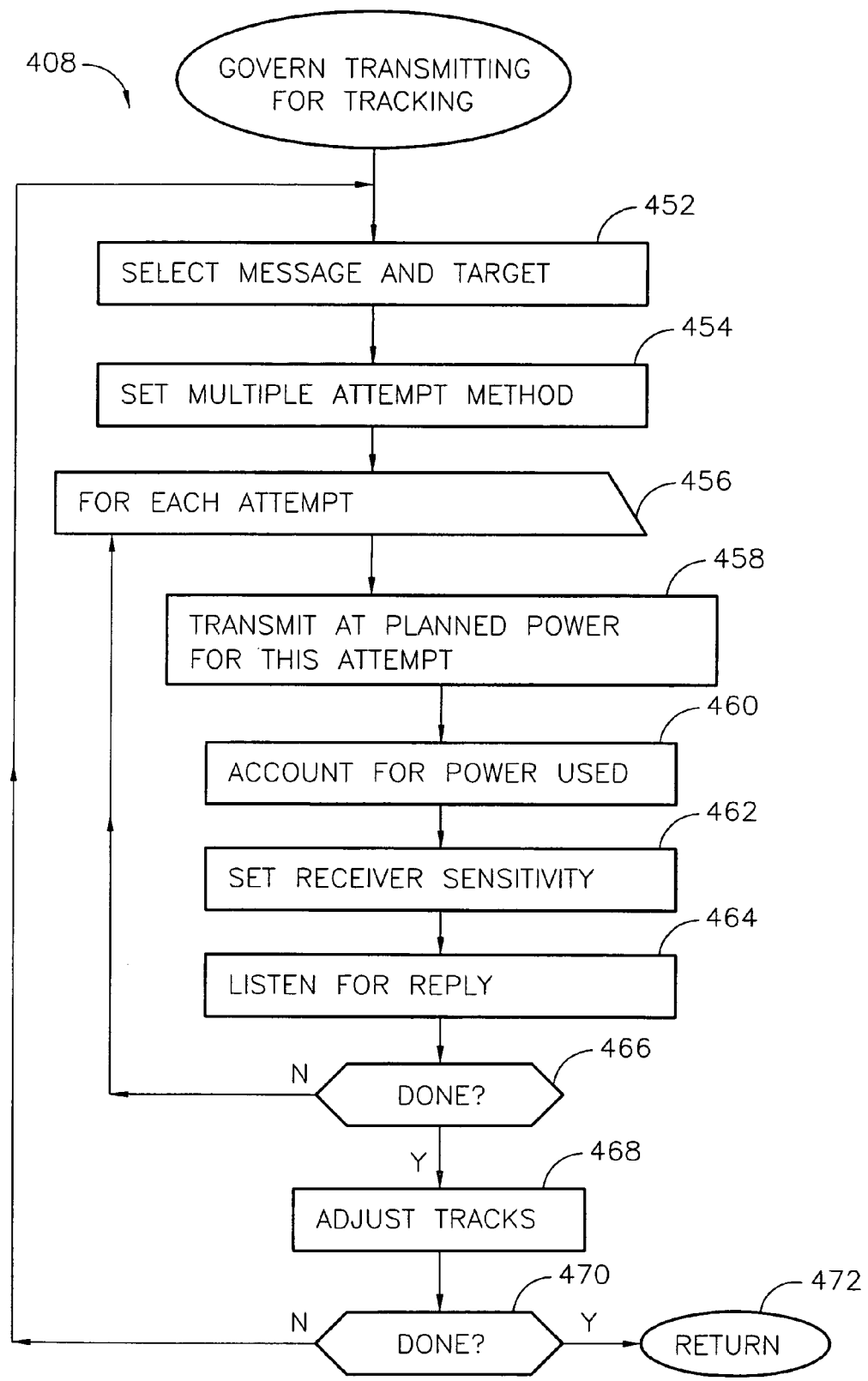

Governing transmitting for tracking may proceed according to a method 408 of FIG. 4D. Transmitting may continue in a loop (452–470) until all planned transmissions have been accomplished, the budget is spent, or no further time remains in the transmission cycle. Within the loop, a target and a message intended for the target are selected (452). Any transmitter unit in the environment may be considered a target for transmitting. Alternatively, a target may include a set of transmitter units (e.g., all within a range of addresses) or all transmitter units (e.g., a universal "all call" address). Messages may include squitters, interrogations, and replies.

For the selected target and message and for this transmitting cycle, a determination is made whether the transmission should be repeated if no reply is properly received. If so, a method for making multiple transmissions is selected or set (454), where each transmission is an attempt to properly receive a reply).

For each attempt, a power cap is determined, preferably with reference to the planned allocations (404 of FIG. 4A). Transmissions to the same target in a series of transmitting cycles may use different power caps in each transmission cycle (e.g., a series). In an implementation consistent with DO 185A, the power cap may be determined according to an interference limiting method and/or a whisper shout method (e.g., a series, T1–T3 of FIG. 5). In another implementation, the power cap may be set with reference to the received signal strength of a prior reply from the selected target in a method of the type described by Curtis in U.S. Pat. No. 5,280,285. Preferably, the power cap is determined from planned allocations as discussed above with reference to a maximum allocation (434, 436, 438, 442, 439 of FIG. 4C).

To allow several opportunities for receiving a reply (e.g., when the reply is expected to immediately follow a transmitted message), the transmission cycle may include several transmissions to the same target. Transmitting the selected message to the selected target, therefore, proceeds in a loop (456–466). Within the transmitting loop, the message is transmitted at a power not to exceed the power cap (458), the transmitted power is subtracted (460) from the power budget (TTP), the receiver sensitivity is determined (456) (e.g., as discussed herein with reference to MTL), and a period of time is allowed for listening for a reply (464). If a further opportunity for receiving a reply is desired (e.g., a reply was not received and the maximum desired number of retries has not already occurred), then control passes (466) to the top of the loop (456) for another attempt.

After replies if any have been received, tracks are adjusted (468); and, cumulative expenditures for power and elapsed time are respectively compared (470) to TTP and the duration of the transmission cycle. If power and time remain, control passes to the top of the loop (452). Otherwise, control returns (472) to the calling process.

According to various aspects of the present invention, a first power cap ($P_A$) applies to communication intended to be received by one selected target; and, a second, typically higher, power cap ($P_B$) applies to communication of a broadcast nature intended to be received by numerous aircraft that may be within a particular range from the host aircraft. The first power cap may be determined as discussed above according to a distribution model and a formation model (e.g., 402, 404). In one implementation, the effect of a distribution model and the effect of a formation model are accomplished by adjusting a result of the distribution model in accordance with parameters of the formation model. In another implementation, aspects of the formation model are made part of an otherwise conventional distribution model, resulting in an integrated distribution model. An integrated distribution model in one implementation of the present invention is described below with reference to $NTA_x$, $\alpha_1$, and $\alpha_2$. In yet another implementation, results of the integrated distribution model are adjusted.

A maximum value for the first power cap may be a specified for an environment to reserve higher power capability for a series of transmissions (e.g., a whisper/shout series). For instance, the maximum for the first power cap ($P_{AMAX}$) may be a constant amount (e.g., 10 dB, according to DO-185A) below a maximum power permitted in the environment ($P_{MAX}$) (e.g., 17 dBm for $P_{MAX}$ of 27 dBm).

An adjustment to the maximum first power cap may be applied according to the present invention, based on at least one of the number of members of the same formation having active transmitter units, and the altitude of the host (e.g., vehicle, aircraft). In one implementation, the first adjustment is subtracted from the maximum first power cap to yield an adjusted maximum first power cap ($P_{A2}$) used for allocations (434) as discussed above. To fit within TTP (442), planned allocations may use a first power cap in planned allocations that is less than the adjusted maximum first power cap (e.g., as low as $P_{A1}$ of FIG. 5). More particularly, the adjustment may be determined by table lookup or logic that implements the following table:

TABLE 1

| Count of formation members | Adjustment when Host Altitude < 18,000 feet barometric altitude | Adjustment when Host Altitude > 18,000 feet barometric altitude |
|---|---|---|
| 1–6 | 1 dB | 3 dB |
| 6–12 | 3 dB | 6 dB |
| >12 | 6 dB | 10 dB |

The count of formation members in Table 1 assumes that each formation member is contributing in some way to radio congestion in the environment. In alternative implementations, the count of formation members excludes one or more of: (a) formation members that are currently performing passive surveillance, (b) formation members that are not broadcasting identification, and (c) formation members not currently having an active transponder.

Figure 6:
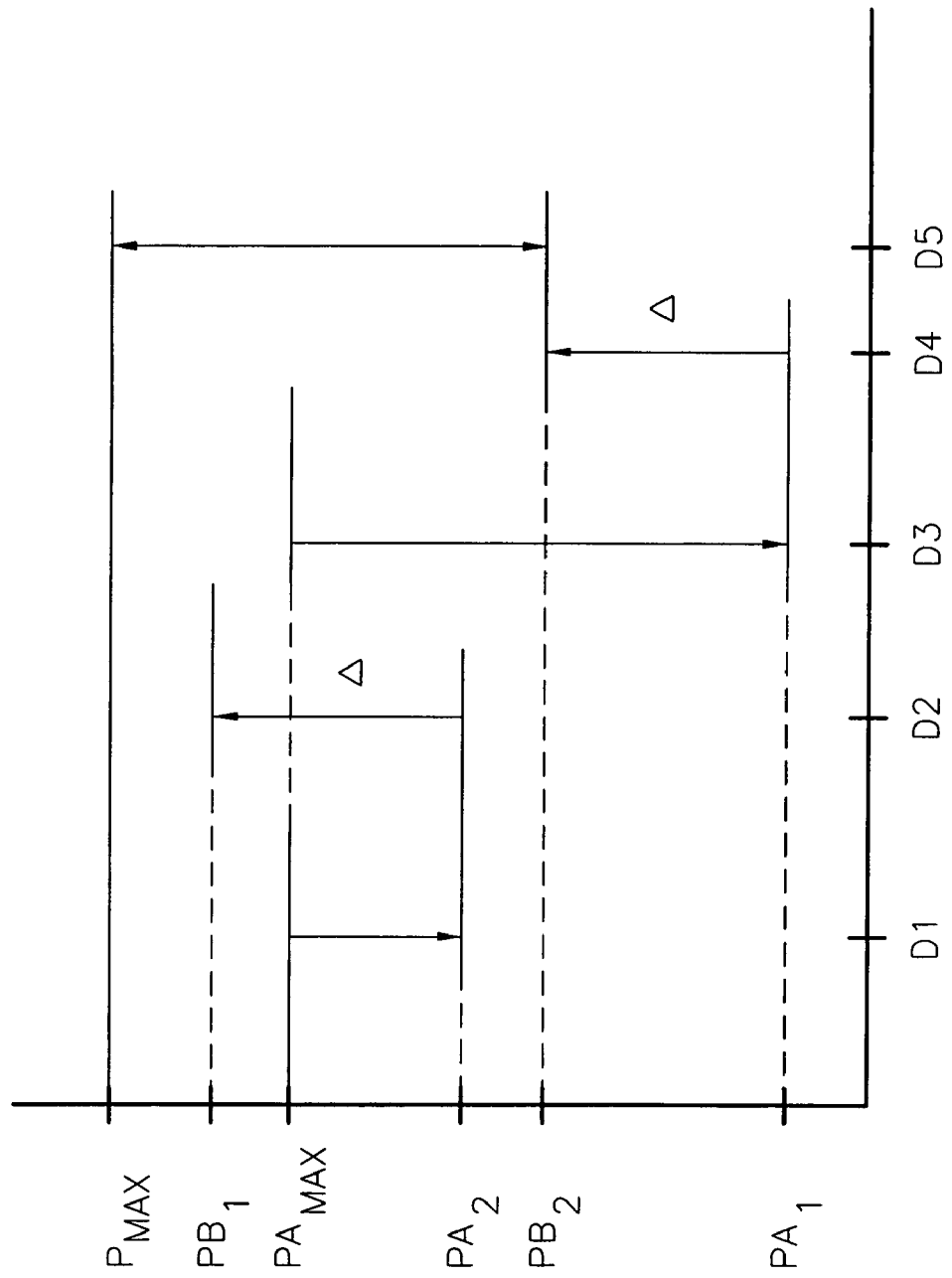
FIG. 6 is a graph of identity broadcast power criteria used by the transmitter of FIG. 2.

Transmitting for broadcasting identification may be subject to a second power cap ($P_B$) that may be determined with reference to the maximum first power cap ($P_{AMAX}$) or a value of the first power cap (e.g., $P_{A1}$ or $P_{A2}$) discussed above. In one implementation, determining a broadcast power cap ($P_B$) includes a series of determinations (D1–D5) illustrated in FIG. 6. In FIG. 6, power magnitudes discussed above with reference to FIG. 5 including $P_{MAX}$, $P_{AMAX}$, $P_{A2}$, and $P_{A1}$, are indicated.

The second power cap ($P_{B1}$) may be a specified relative to the first power cap ($P_{A2}$) after the adjusted first power cap is determined as discussed above. For instance, the first power cap ($P_{A2}$) may be reduced from the maximum first power cap ($P_{AMAX}$) per Table 1 as illustrated at D1 of FIG. 6. The second power cap may be a constant amount (e.g., about 10 dBm) above the adjusted first power cap ($P_{A2}$) as in D2 of FIG. 6. When the first power cap is reduced (D3) in accordance with a distribution model and a formation model as discussed above (e.g., down to as low as $P_{A1}$), $P_{B1}$ may be commensurately reduced to maintain (D4) a constant difference between the first and the second power caps (D4 same as D2) (e.g., about 10 dBm).

According to various aspects of the present invention, the lowest transmit power used for a first power cap in a transmit cycle is used as a basis (D4) for determining the second power cap. Further, broadcasting may be discontinued when the determined broadcast power cap is more than a constant amount below the permitted maximum transmit power for the environment. For instance, broadcasting may be discontinued when the second power cap ($P_{B2}$) is below the permitted maximum transmit power for the environment ($P_{MAX}$) by about 15 dBm (D5 of FIG. 6).

In an implementation for air traffic collision avoidance according to various aspects of the present invention, a system includes a transmitter unit on each participating aircraft and may include transmitter units on the ground such as transmitter units in aircraft on the ground, in vehicles on the ground, or in ground stations. In addition to various aspects of the present invention discussed above, these transmitter units may operate according to a traffic collision avoidance system (TCAS) of the type described in DO 185A. Further, each transmitter unit may include the capability to reduce the total interrogation power allowance (e.g., $P_{AMAX}$) and the maximum transmission power limit (TTP) proportionately as the number of transmitter unit equipped aircraft within the detection volume increases. In conjunction with power reduction, the minimum threshold level (MTL per DO 185A) for squitter listening may be increased to preclude detection of aircraft that are outside the reduced surveillance range. In an environment having a plurality of transmitter units, the power reductions are typically implemented by transmitter units hosted on a member aircraft of a formation and operating in one of perhaps several member modes as designated by a manually operated switch (e.g., 'Member' or 'Member-ATC Off'). For convenience of description, these functions are discussed below with reference to a TCAS upgraded to include a power reduction mode having all of the power determination techniques discussed above.

A system for transmitting into a shared medium includes a processor, a transmitter, and a receiver. The processor is coupled to the transmitter for transmitting in a manner, at a time, and at a power level as directed by the processor. The processor determines from cooperation with the receiver the number of transmitters expected to be sharing the medium at a future time when transmitting is desired; prescribes a total power for a plurality of transmissions; and prescribes a maximum power for individual transmissions of various types. As implemented for air traffic collision avoidance, a suitable total power for MODE S interrogations transmitted by a TCAS unit on the host aircraft and a suitable power level for individual interrogation transmissions are set according to the detected number of operational TCAS in the airspace, the detected or reported number of members in a flight formation that includes the host aircraft, the altitude of the host aircraft, and the distances from the host aircraft to other members of the flight formation. Other implementations adjust receiver sensitivity, for example, increasing the minimum trigger level (MTL) for detecting interrogations and squitters. With decreased receiver sensitivity, continued use of limited transmission power levels improves system reliability and decreases interference of TCAS with other systems such as ATCRBS. Further implementations revise conventional TCAS interference limiting techniques. Transmission of broadcast messages may be conducted at reduced power or omitted.

A conventional TCAS includes at least one transponder, a processor, and a display. In one implementation the TCAS processor and a transponder for interrogations and replies are packaged in a TCAS processor unit; a display responsive to signals from the TCAS processor unit is packaged as a separate display unit; and a transponder for Mode S squitters and replies is packaged in a separate transponder unit. In other implementations, the functions of any or all of the above units are combined into an integrated unit. The display unit provides annunciations (visual and auditory) to inform the flight crew of the results of surveillance. For example, a cockpit display shows an up to date presentation of nearby traffic. When nearby traffic encroaches within a caution perimeter around the host aircraft, visual and auditory cautions may be annunciated. When nearby traffic encroaches within a warning perimeter, visual and auditory warnings may be annunciated. These annunciations include conventional traffic advisories and resolution advisories.

Power reduction may result in limited TCAS functions, and if so, a suitable annunciation is presented to inform the flight crew that surveillance may not be sufficient to support: (a) display of nearby traffic, (b) resolution advisories, and/or (c) surveillance beyond a predetermined range such as a minimum distance for collision avoidance (e.g. 14 nmi).

Operation in a member mode according to various aspects of the present invention includes unconditional operation according to conventional interference limiting of the type described in DO 185A and modified as follows. The count of nearby aircraft ($NTA_x$) is augmented by the number of cooperative member aircraft equipped with a suitable transmitter unit. Consequently, total interrogation transmission power allowance and maximum interrogation transmission power allowance are reduced. In addition, ATCRBS and Mode S surveillance levels are balanced by allocating the reduced transmit power allowances between the two surveillance processes according to a priority scheme.

Operation in power reduction (PR) mode may be inhibited for a host aircraft when the transmitter unit is operating in a mode (314) other than 'MEMBER' or 'MEMBER-ATC OFF' as specified by a switch position read (310) from a user operated panel. While the host is a member of a formation and is above about 18,000 feet barometric altitude, PR mode is automatically enabled and disabled according to several criteria: (a) PR mode is enabled on determining that the host aircraft is above 18,000 feet (with hysteresis of about +/−500 feet), a target (e.g., another aircraft) is identified as a cooperative member, and the target is within about 24 nmi of the host aircraft; and (b) PR mode is disabled on determining that all targets identified as cooperative members are beyond about 30 nmi from the host aircraft. While the host is a member of a formation and is below about 18,000 feet (with hysteresis of about +/−500) barometric altitude: (a) PR mode is enabled on determining that the host aircraft is below 18,000 feet (with hysteresis of about +/−500 feet), a target (e.g., another aircraft) is identified as a cooperative member, and the target is within about 12 nmi of the host aircraft; and (b) PR mode is disabled on determining that no cooperative aircraft is within about 14 nmi from the host aircraft. When PR mode is disabled, a conventional interference limiting method is implemented for controlling transmitted power.

At higher altitudes, aircraft velocity is generally greater than at lower altitudes. For purposes of avoiding collision, a nominal surveillance range of about 14 nmi is considered adequate for timely resolution advisories in head-on encounters at closing speed of about 1,200 kts. Surveillance range less than about 14 nmi is considered adequate for other encounters (e.g., about 9 nmi. for approaches from the side; and about 5 nmi for approaches from the rear). By comparison, it is considered adequate when the host aircraft is below about 10,000 feet to provide surveillance ranges of about 4 nmi for head-on encounters, and less for other encounters (e.g., about 2.5 for approaches from the side; and about 1.5 for approaches from the rear).

Operation in PR mode includes calculating a total interrogation power allocation (e.g., TTP) and a minimum transmission attenuation according to an interference limiting method as modified according to various aspects of the present invention. Such an interference limiting method is applied when the host aircraft altitude is greater than about 18,000 feet. The method includes a distribution model indicated at least in part in the following mathematical expressions. The power ascribed by the method is a power that meets all three of inequalities (1), (2), and (3). Further, if the host aircraft is above about 18,000 feet, the total interrogation power allowance is about 75% of the power that meets inequalities (1), (2), and (3) (i.e., a reduction of about 25%).

$$\sum_{i=1}^{I} \left[ \frac{P(i)}{250 \text{ watts}} \right]^\alpha \le \text{MIN}\left( \frac{280}{NTA_{30}+1}, \frac{11}{\alpha^2} \right) \quad (1)$$

$$\sum_{i=1}^{I} M(i) \le .0.01 \text{ seconds} \quad (2)$$

$$\frac{1}{B}\sum_{k=1}^{K} \left[ \frac{PA(k)}{250 \text{ watts}} \right] \le \text{MIN}\left( \frac{80}{NTA_{30}+1}, 3 \right) \quad (3)$$

(4) $\alpha = \text{MIN}(\text{smoothed}(\alpha_1), \text{smoothed}(\alpha_2))$ (5) $\text{smoothed}(\alpha_1) = \alpha_{1(prior\ scan)} + 0.2(\alpha_{1(this\ scan)} - \alpha_{1(prior\ scan)})$ (6) $\text{smoothed}(\alpha_2) = \alpha_{2(prior\ scan)} + 0.2(\alpha_{2(this\ scan)} - \alpha_{2(prior\ scan)})$ $$\alpha_1 = \begin{cases} 1.0 \text{ when } (NTA_6 \le 1) \\ \text{or} \\ 1.0 \text{ when } [(NTA_6 \le 4) \cdot (NTA_3 \le 2) \cdot (NTA_{30} < 25)] \\ \text{or} \\ 0.5 \text{ when } \{(NTA_3 > 2) \cdot (NTA_6 > 2NTA_3) \cdot (NTA_{30} < 40)\} \\ \text{otherwise} \\ \frac{1}{4}\left[\frac{NTA_6}{NTA_3}\right] \end{cases} \quad (7)$$

$$\alpha_2 = \frac{\log_{10}\left[\frac{NTA_{30}}{NTA_6}\right]}{\log_{10} 25} \quad (8)$$

Where:

I is the number of TCAS interrogations excluding air-to-air coordination interrogations transmitted by the host transmitter unit in a surveillance update interval; Mode 2 interrogations are included;

B is about 1.2 for a four-beam antenna;

P(i) is the total radiated power (in watts) from the antenna for the $i^{th}$ interrogation;

$NTA_x$ (where x is 3 nmi, 6 nmi, or nominally 30 nmi) is the number of airborne transmitter units within the range designated by x; a receiver sensitivity of about −74 dBm is used for the nominal 30 nmi range count; tracks may be used for determining range for other counts; cooperative members are not included in $NTA_3$ or $NTA_6$; the number of cooperative members is added to $NTA_{30}$; all adjustments to $NTA_x$, are made prior to evaluation of inequalities (1), (2), and (3);

M(i) is the duration of the mutual suppression interval for the host transponder associated with the $i^{th}$ interrogation;

K is the number of Mode C interrogations transmitted by the host transmitter unit in a surveillance update interval; and PA(k) is the total radiated power (in watts) from the antenna for the $k^{th}$ Mode C interrogation.

In PR mode for an airborne host, the lower bounds ensuring maximum attenuation of about 10 dB for Mode S interrogation transmissions and about 7 dB for ATCRBS interrogation transmissions are not applied.

As a consequence of the above distribution model and method of interference limiting, the total and maximum interrogation transmission power allowances may be well below the levels necessary to provide active tracking of nearby aircraft. Some or all of the cooperating member aircraft are included twice in the $NTA_{30}$ counts: once due to received broadcast interrogations and once due to cooperative member status. Some member aircraft (e.g., those having no TCAS but having MODE S or ATCRBS capability) are included once in the $NTA_{30}$ counts. By including the cooperative member aircraft in these counts, suitable power reduction occurs during surveillance intervals where relatively large reductions in broadcast transmission power levels are desired. The use of values of 1.0 for $\alpha_1$ and $\alpha_2$ above about 10,000 feet moderates the degradation of surveillance that may be caused by the method of interference limiting in transitional airspace.

Operating in PR mode includes eliminating ATCRBS whisper-shout interrogations according to a sequence: forward beam until the highest step applicable to the forward beam is equal to the step being used for side beams; then, forward, left, and right until the step used is equal to the step being used for the aft beam. When restoring power, power is added in a reverse of the order in which the power was removed. In PR mode, ATCRBS whisper-shout interrogations and interference limiting are eliminated using the same method as specified in DO 185A when the host aircraft is on the ground. This method retains the surveillance range to the sides and aft of the aircraft to a relatively greater extent to facilitate situational awareness for cooperative formation flight and refueling flight.

An interference limiting method according to various aspects of the present invention for use when the host aircraft is below about 18,000 feet barometric altitude includes a distribution model indicated at least in part in the following mathematical expressions. The power ascribed by the method is a power that meets all three of inequalities (1), (2), and (3) below. Further, if the host aircraft is below 18,000 feet, the total power allowance is about 60% of the power that meets inequalities (1), (2), and (3) below (i.e., a reduction of about 40%).

$$\sum_{i=1}^{I} \left[ \frac{P(i)}{250 \text{ watts}} \right] \leq 11 \quad (9)$$

$$\sum_{i=1}^{I} M(i) \leq .01 \text{ seconds} \quad (10)$$

$$\frac{1}{B} \sum_{k=1}^{K} \left[ \frac{PA(k)}{250 \text{ watts}} \right] \leq 3 \quad (11)$$

(12) $\alpha$=MIN (smoothed($\alpha_1$), smoothed($\alpha_2$))

(13) smoothed($\alpha_1$)=$\alpha_{1(prior\ scan)}$+0.2($\alpha_{1(this\ scan)}$−$\alpha_{1(prior\ scan)}$)

(14) smoothed($\alpha_2$)=$\alpha_{2(prior\ scan)}$+0.2($\alpha_{2(this\ scan)}$−$\alpha_{2(prior\ scan)}$)

$$\alpha_1 = \begin{cases} 1.0 \text{ when } (NTA_6 \leq 1) \\ \text{or} \\ 1.0 \text{ when } [(NTA_6 \leq 4) \cdot (NTA_3 \leq 2) \cdot (NTA_{30} < 25)] \\ \text{or} \\ 1.0 \text{ when (host altitude > about 10,000 feet)} \\ \text{or} \\ 0.5 \text{ when } \{(NTA_3 > 2) \cdot (NTA_6 > 2NTA_3) \cdot (NTA_{30} < 40)\} \\ \text{otherwise} \\ \frac{1}{4}\left[\frac{NTA_6}{NTA_3}\right] \end{cases} \quad (15)$$

$$\alpha_2 = \frac{\log_{10}\left[\frac{NTA_{30}}{NTA_6}\right]}{\log_{10} 25} \quad (16)$$

When operation in PR mode is discontinued, an immediate increase in the total available power is likely to result from returning to a conventional interference limiting method. To provide hysteresis, the total available power as a percentage of the total power allowance computed using a conventional interference limiting method is increased by 5% in each ensuing surveillance update interval until power reduction according to the conventional interference limiting method is being applied.

In another implementation for air traffic collision avoidance according to various aspects of the present invention, each transmitter unit may include the capability to reduce the power for individual transmissions. In one arrangement, the transmit power is limited by a prescribed attenuation of the signal to be transmitted.

In another implementation for air traffic collision avoidance according to various aspects of the present invention, each transmitter unit may include the capability to adjust receiver sensitivity. For example, the acquisition squitter listening threshold (MTL) may be raised to avoid reception from (and consequently scheduled transmissions to) aircraft deemed too distant from the host aircraft. By avoiding reception, transmissions (e.g., replies or solicited replies from the host aircraft) to the distant aircraft are avoided and, therefore, interference with other radio transmissions in the region around the host aircraft is reduced. Furthermore, increased transmit power may be available for higher priority transmissions. To adjust receiver sensitivity, an acquisition squitter listening threshold (minimum threshold level or MTL) may be increased. The increase in MTL may be proportional to the prescribed attenuation in an implementation that combines receiver sensitivity adjustment with other implementations discussed above.

A transmitter unit having capability to adjust transmission attenuation and/or adjust MTL as discussed above may determine minimum attenuation and/or MTL according to methods of the type described by DO 185A. According to various aspects of the present invention, while the transmitter unit is operating in PR mode (e.g., part of a formation) these parameters are adjusted as follows: (a) if the host aircraft is above about 18,000 feet barometric altitude (with about +/−500 feet hysteresis), the minimum attenuation may be increased about 1 dB; and otherwise, (b) the minimum attenuation may be increased about 3 dB. Further, broadcast interrogations are attenuated by about 1 dB for each 1 dB increase in acquisition attenuation above about 11 dB. MTL is adjusted to correspond to the minimum acquisition attenuation (e.g., the Mode S attenuation).

Conventional TCAS operating modes provide that maximum acquisition (Mode S) attenuation is limited to 10 dB and TCAS broadcast interrogations are transmitted at full power. According to various aspects of the present invention, reducing transmit power used for broadcast interrogations, when Mode S acquisition power is reduced more than 11 dB maintains the 10 dB differential (e.g., Δ in FIG. 6 D2 and D4) between broadcast interrogations transmit power level and maximum Mode S interrogation transmit power level. Reductions in broadcast power that are consistent with further surveillance power reductions mitigates the interference limiting effect of the broadcast on other transmitter units when the other transmitter units are outside a range suitable for tracking for collision avoidance and/or situational awareness.

According to various aspects of the present invention, resolution advisories are inhibited when power restrictions (whether conventional or per PR mode) are expected to constrict the surveillance range to less than a range adequate to support resolution. If the surveillance range is further constricted to a range that would be inadequate to ensure surveillance of nearby aircraft, a "limited surveillance" condition is annunciated. Inhibiting resolution advisories may be based on whether or not the maximum transmit power reductions prescribed by conventional interference limiting are reached. When operating in PR mode, resolution advisories may be inhibited based on whether (a) Mode S acquisition attenuation is about 10 dB or more; and/or (b) the available total power for the ensuing surveillance interval is less than the equivalent of about 3 full power interrogations. To provide a hysteresis effect, discontinuing PR mode may remove resolution advisory inhibiting if Mode S acquisition attenuation is less than about 12 dB and available total power for the ensuing surveillance interval is greater than the equivalent of about 4 full power interrogations. When operating in PR mode, "limited surveillance" is annunciated when Mode S acquisition attenuation is more than about 13 dB and/or the available total power for the ensuing surveillance interval is less than the equivalent of about 2 full power interrogations. Hysteresis effect may be provided for discontinuing "limited surveillance" if Mode S acquisition attenuation is more than about 10 dB and the total available power for the ensuing surveillance interval is greater than the equivalent of about 3 full power interrogations.

As discussed above, a system or subsystem that transmits into a shared medium may include a processor, a transmitter, and a receiver. The processor is coupled to the transmitter for transmitting in a manner, at a time, and at a power level as directed by the processor. The processor determines from cooperation with the receiver the number of transmitters expected to be sharing the medium at a future time when transmitting is desired; prescribes a total power for a plurality of transmissions; and prescribes a maximum power for individual transmissions of various types. As implemented for air traffic collision avoidance, a suitable total power for MODE S interrogations transmitted by a TCAS unit on the host aircraft and a suitable power level for individual interrogation transmissions are set according to the detected number of operational TCAS in the airspace, the detected or reported number of members in a flight formation that includes the host aircraft, the altitude of the host aircraft, and the distances from the host aircraft to other members of the flight formation. Other implementations adjust receiver sensitivity, for example, increasing the minimum trigger level (MTL) for detecting interrogations and squitters. With decreased receiver sensitivity, continued use of limited transmission power levels improves system reliability and decreases interference of TCAS with other systems such as ATCRBS. Further implementations revise conventional TCAS interference limiting techniques. Transmission of broadcast messages may be conducted at reduced power or omitted.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method for transmitting into a medium into which a plurality of transmitters may transmit, the method comprising:
    a step for receiving a plurality of signals;
    a step for determining a distribution model of a distribution of transmitters of the plurality in accordance with received signals of the plurality;
    a step for determining a formation model of a formation in which a distribution of the plurality of transmitters are positioned in accordance with received signals of the plurality;
    a step for determining a total transmit power for a subsequent period of time, wherein the total transmit power is determined in accordance with the distribution model and the formation model; and
    a step for transmitting not more than the total transmit power during the subsequent period of time.

2. The method of claim 1 wherein the distribution model is consistent with conventional interference limiting for aircraft traffic collision avoidance.

3. The method of claim 2 wherein:
    the method further comprises a step for revising a parameter of the distribution model in accordance with a determination of a formation in the formation model; and
    the step for determining the total transmit power comprises a step for determining the total transmit power in accordance with the revised parameter.

4. The method of claim 3 wherein the parameter comprises at least one of $\alpha 1$ and $\alpha 2$ of a conventional distribution model for aircraft traffic collision avoidance.

5. The method of claim 1 wherein:
    the transmitter and at least one other transmitter are part of a formation; and
    the formation model comprises a magnitude in accordance with a distance from the transmitter to the other transmitter.

6. The method of claim 5 wherein the formation model further comprises a magnitude in accordance with an altitude of the transmitter.

7. The method of claim 6 wherein the formation model further comprises a count of formation members having active transmitters of the plurality.

8. The method of claim 1 wherein:
the distribution model is consistent with conventional interference limiting for aircraft traffic collision avoidance, each transmitter of the plurality being aboard a respective aircraft;
the formation model comprises a first count of formation member aircraft that are within a first range, a second count of formation member aircraft that are within a second range greater than the first range, and a third count of formation member aircraft that are within a third range greater than the second range; and
the distribution model, being further consistent with the formation model, comprises a fourth count of aircraft within the first range excluding the first count, a fifth count of aircraft within the second range excluding the second count, and a sixth count of aircraft within the third range including the third count.

9. The method of claim 5 further comprising a step for selecting a mode of transmitter operation from at least one of an active interrogating mode and a passive non-interrogating mode, wherein selection is in accordance with the distance.

10. The method of claim 1 further comprising:
a step for transmitting during the period a plurality of first priority messages and a plurality of second priority messages; and
a step for limiting transmitting in accordance with the total transmit power and a sum of each respective power allocated to each transmission of the first priority messages and the second priority messages.

11. The method of claim 1 further for receiving transmissions transmitted from other transmitters of the plurality, the method further comprising a step for determining receiver sensitivity for receiving during the subsequent period of time.

12. The method of claim 1 further comprising transmitting into the medium in accordance with air traffic control radar beacon system signaling.

13. The method of claim 1 further comprising transmitting into the medium in accordance with Mode S signaling.

14. A memory comprising indicia of the method of claim 1.

15. A transponder comprising a processor, a receiver, and a transmitter in cooperation that perform the method of claim 1.

16. A traffic collision avoidance system (TCAS) comprising a processor, a receiver, and a transmitter in cooperation that perform the method of claim 1, wherein the processor further tracks nearby traffic and initiates annunciations to a provided display.

17. A method for tracking proximity of vehicles of a plurality, each vehicle comprising a transmitter for transmitting location information, the method comprising:
a step for receiving the location information;
a step for determining a distribution model of a distribution of transmitters of the plurality;
a step for determining a formation model of a formation in which the transmitter is positioned; and
a step for determining a total transmit power for a subsequent period of time, wherein the total transmit power is determined in accordance with the distribution model and the formation model;
a step for transmitting interrogations in accordance with the total transmit power;
a step for determining a receiver sensitivity for receiving during the subsequent period of time;
a step for receiving location information; and
a step for determining a track of a vehicle of the plurality in accordance with the received location information.

18. A memory comprising indicia of the method of claim 17.

19. A traffic collision avoidance system (TCAS) comprising a processor, a receiver, and a transmitter in cooperation that perform the method of claim 17, wherein the processor further initiates annunciations to a provided display.

20. The method of claim 17 wherein:
the distribution model is consistent with conventional interference limiting for aircraft traffic collision avoidance, each transmitter of the plurality being aboard a respective aircraft;
the formation model comprises a first count of formation member aircraft that are within a first range, a second count of formation member aircraft that are within a second range greater than the first range, and a third count of formation member aircraft that are within a third range greater than the second range; and
the distribution model, being further consistent with the formation model, comprises a fourth count of aircraft within the first range excluding the first count, a fifth count of aircraft within the second range excluding the second count, and a sixth count of aircraft within the third range including the third count.

21. A system for transmitting into a medium into which a plurality of transmitters may transmit, the system comprising:
means for determining a distribution model of a distribution of transmitters of the plurality;
means for determining a formation model of a formation in which a distribution of the plurality of transmitters are positioned; and
means for determining a total transmit power for a subsequent period of time, wherein the total transmit power is determined in accordance with the distribution model and the formation model; and
means for transmitting into the medium in accordance with the total transmit power.

22. The system of claim 21 wherein the distribution model is consistent with conventional interference limiting for aircraft traffic collision avoidance.

23. The system of claim 22 wherein:
the system further comprises means for revising a parameter of the distribution model in accordance with a determination of a formation in the formation model; and
the means for determining the total transmit power comprises means for determining the total transmit power in accordance with the revised parameter.

24. The system of claim 23 wherein the parameter comprises at least one of $\alpha 1$ and $\alpha 2$ of a conventional distribution model for aircraft traffic collision avoidance.

25. The system of claim 21 wherein:
the means for transmitting is aboard a host vehicle and at least one other transmitter of the plurality are part of a formation that includes the host vehicle; and
the formation model comprises a magnitude in accordance with a distance from the host vehicle to the other transmitter.

26. The system of claim 25 wherein the formation model further comprises a magnitude in accordance with an altitude of the host vehicle.

27. The system of claim 26 wherein the formation model further comprises a count of formation members having active transmitters of the plurality.

28. The system of claim 25 further comprising means for selecting a mode of transmitter operation from at least one of an active interrogating mode and a passive non-interrogating mode, wherein selection is in accordance with the distance.

29. The system of claim 21 further wherein:
the means for transmitting transmits during the period a plurality of first priority messages and a plurality of second priority messages; and
the system further comprises means for limiting transmitting in accordance with the total transmit power and a sum of each respective power allocated to each transmission of the first priority messages and the second priority messages.

30. The system of claim 21 further comprising:
means for receiving transmissions transmitted from other transmitters of the plurality; and
means for determining receiver sensitivity for receiving during the subsequent period of time.

31. The system of claim 21 wherein the means for transmitting into the medium transmits in accordance with air traffic control radar beacon system signaling.

32. The system of claim 21 wherein the means for transmitting into the medium transmits in accordance with Mode S signaling.

33. The system of claim 21 wherein:
the distribution model is consistent with conventional interference limiting for aircraft traffic collision avoidance, each transmitter of the plurality being aboard a respective aircraft;
the formation model comprises a first count of formation member aircraft that are within a first range, a second count of formation member aircraft that are within a second range greater than the first range, and a third count of formation member aircraft that are within a third range greater than the second range; and
the distribution model, being further consistent with the formation model, comprises a fourth count of aircraft within the first range excluding the first count, a fifth count of aircraft within the second range excluding the second count, and a sixth count of aircraft within the third range including the third count.

34. A system for tracking proximity of vehicles of a plurality, each vehicle comprising a transmitter for transmitting location information, the system comprising:
means for receiving the location information;
means for determining a distribution model of a distribution of transmitters of the plurality;
means for determining a formation model of a formation in which the transmitter is positioned; and
means for determining a total transmit power for a subsequent period of time, wherein the total transmit power is determined in accordance with the distribution model and the formation model;
means for transmitting interrogations in accordance with the total transmit power;
means for determining a receiver sensitivity for receiving during the subsequent period of time; and
means for determining a track of a vehicle of the plurality in accordance with the received location information.

35. The system of claim 34 wherein:
the distribution model is consistent with conventional interference limiting for aircraft traffic collision avoidance, each transmitter of the plurality being aboard a respective aircraft;
the formation model comprises a first count of formation member aircraft that are within a first range, a second count of formation member aircraft that are within a second range greater than the first range, and a third count of formation member aircraft that are within a third range greater than the second range; and
the distribution model, being further consistent with the formation model, comprises a fourth count of aircraft within the first range excluding the first count, a fifth count of aircraft within the second range excluding the second count, and a sixth count of aircraft within the third range including the third count.

* * * * *